United States Patent
Jackson et al.

(10) Patent No.: US 7,494,619 B2
(45) Date of Patent: Feb. 24, 2009

(54) HIGH TEMPERATURE ALLOYS, AND ARTICLES MADE AND REPAIRED THEREWITH

(75) Inventors: Melvin Robert Jackson, Niskayuna, NY (US); Liang Jiang, Guilderland, NY (US); Ji-Cheng Zhao, Latham, NY (US); Canan Uslu Hardwicke, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 691 days.

(21) Appl. No.: 10/747,712

(22) Filed: Dec. 23, 2003

(65) Prior Publication Data

US 2005/0133122 A1 Jun. 23, 2005

(51) Int. Cl.
*C22C 5/04* (2006.01)
(52) U.S. Cl. ...................................... 420/462
(58) Field of Classification Search ............... 420/462; 428/660
See application file for complete search history.

(56) References Cited

U.S. PATENT DOCUMENTS

| | | | |
|---|---|---|---|
| 1,990,277 A | 2/1935 | Feussner et al. | |
| 2,370,242 A * | 2/1945 | Hensel et al. | 75/245 |
| 2,636,819 A | 4/1953 | Streicher | |
| 3,622,310 A | 11/1971 | Reinacher et al. | |
| 3,640,705 A | 2/1972 | Selman et al. | |
| 3,773,482 A | 11/1973 | Hansen et al. | |
| 4,305,998 A * | 12/1981 | Manty et al. | 428/661 |
| 4,399,199 A * | 8/1983 | McGill et al. | 428/633 |
| 6,129,997 A | 10/2000 | Braun et al. | |
| 6,623,692 B2 * | 9/2003 | Jackson et al. | 420/462 |
| 2002/0056491 A1 | 5/2002 | Manhardt et al. | |
| 2003/0049156 A1 | 3/2003 | Jackson et al. | |
| 2003/0079810 A1 | 5/2003 | Jackson et al. | |
| 2003/0118448 A1 | 6/2003 | Lee et al. | |

FOREIGN PATENT DOCUMENTS

| | | |
|---|---|---|
| EP | 0 732 416 | 9/1996 |
| WO | WO 03/081702 | 10/2003 |

OTHER PUBLICATIONS

European Search Report dated May 3, 2005.
XP002325610, O. Kurtz, "*The Growth of Rhodium on a Graphite and a Rhenium Surface*", Universität Berlin, Fachbereich Biologie, Berlin, pp. 138 and 184, 1999.
XP002325611, W. Wegscheider, "*Skriptum: Chemie/Chem. Technol.*", Institute Für Eleektrochemie, Montanuniversität Leoben, Leoben, p. 43, 1996.

* cited by examiner

*Primary Examiner*—John P. Sheehan
*Assistant Examiner*—Jessee R. Roe
(74) *Attorney, Agent, or Firm*—Paul J. DiConza

(57) ABSTRACT

An alloy, an article comprising the alloy, and methods for manufacturing and repairing an article that employ the alloy are presented. The alloy comprises, in atom percent, at least about 50% rhodium, up to about 49% of a first material, from about 1% to about 15% of a second material, and up to about 10% of a third material. The first material comprises at least one of palladium, platinum, iridium, and combinations thereof. The second material comprises at least one of tungsten, rhenium, and combinations thereof. The third material comprises at least one of ruthenium, chromium, and combinations thereof. The alloy comprises an A1-structured phase at temperatures greater than about 1000° C., in an amount of at least about 90% by volume.

15 Claims, No Drawings ically recognized to have service capabilities limited to a temperature of about 1200° C., conventional superalloys used in gas turbine airfoils often operate at the upper limits of their practical service temperature range. In typical jet engines, for example, bulk average airfoil temperatures range from about 900° C. to about 1100° C., while airfoil leading and trailing edge and tip temperatures can reach about 1150° C. or more. At such elevated temperatures, the oxidation process consumes conventional superalloy parts, forming a weak, brittle metal oxide that is prone to chip or spall away from the part.

Erosion and oxidation of material at the edges of airfoils lead to degradation of turbine efficiency. As airfoils are worn away, gaps between components become excessively wide, allowing gas to leak through the turbine stages without the flow of the gas being converted into mechanical energy. When efficiency drops below specified levels, the turbine must be removed from service for overhaul and refurbishment. A significant portion of this refurbishment process is directed at the repair of the airfoil leading and trailing edges and tips. For example, damaged material is removed and then new material built onto the blade by any of several methods, such as, for example, welding with filler material, welding or brazing new sections onto the existing blade, or by plasma spraying or laser deposition of metal powders onto the blade. The performance of alloys commonly used for repair is comparable or inferior to that of the material of the original component, depending upon the microstructure of the repaired material, its defect density due to processing, and its chemistry. Furthermore, in current practice, the original edge material is made of the same material as the rest of the original blade, often a superalloy based on nickel or cobalt. Because this material was selected to balance the design requirements of the entire blade, it is generally not optimized to meet the special local requirements demanded by conditions at the airfoil leading or trailing edges. However, maximum temperatures, such as those present at airfoil tips and edges, are expected in future applications to be over about 1300° C., at which point many conventional superalloys begin to melt.

Clearly, new materials for repair and manufacture must be developed to improve the performance of repaired components and to exploit efficiency enhancements available to new components designed to operate at higher turbine operating temperatures.

BRIEF DESCRIPTION

Embodiments of the present invention address these and other needs. One embodiment is an alloy comprising, in atom percent, at least about 50% rhodium, up to about 49% of a first material, from about 1% to about 15% of a second material, and up to about 10% of a third material. The first material comprises at least one of palladium, platinum, iridium, and combinations thereof. The second material comprises at least one of tungsten, rhenium, and combinations thereof. The third material comprises at least one of ruthenium, chromium, and combinations thereof. The alloy comprises an A1-structured phase at temperatures greater than about 1000° C., in an amount of at least about 90% by volume.

Another embodiment is an article for use in a high temperature, oxidative environment. The article comprises the alloy described above.

A further embodiment is a method for making an article. The method comprises providing the alloy described above.

Another embodiment is a method for repairing an article. The method comprises providing an article, providing a repair material that comprises the alloy described above, and joining the repair material to the article.

DETAILED DESCRIPTION

The description herein employs examples taken from the gas turbine industry, particularly the portions of the gas turbine industry concerned with the design, manufacture, operation, and repair of aircraft engines and power generation turbines. However, the scope of the invention is not limited to only these specific industries, as the embodiments of the present invention are applicable to many and various applications that require materials resistant to high temperature and aggressive environments.

The alloy of the present invention balances a number of competing material requirements, including, for example, strength, ductility, and oxidation resistance. The composition ranges developed for this alloy have been selected based on the need to achieve sufficient strength to withstand the stresses associated with many industrial machine components, while maintaining sufficient ductility to allow the material to be formed into complex shapes. All of this must be done while preserving very high resistance to oxidation.

In accordance with one embodiment of the present invention, the alloy comprises, in atom percent, at least about 50% rhodium and up to about 49% of a first material, where the first material comprises at least one of palladium, platinum, iridium, and combinations thereof. These platinum-group metals are all highly resistant to most forms of environmental attack and provide the alloy of the present invention with extraordinary oxidation resistance at high temperatures. The elements comprising the first material have A1 crystal structures, as does rhodium, and at temperatures above about 1000° C. each of these elements dissolves in rhodium to form a single-phase solid solution having this same crystal structure. This A1-structured phase provides a desirable combination of properties. Having a high amount of A1-structured elements in the alloy promotes the formation and stability of the desirable single-phase microstructure. Accordingly, in certain embodiments, a sum of the atom percentage of rhodium in the alloy plus the atom percentage of the first material in the alloy is at least about 75 atom percent, and in particular embodiments this sum is at least about 85 atom percent. In all cases, the alloy of the present invention comprises, at temperatures greater than about 1000° C., at least about 90% by volume of the A1-structured phase.

The strength of the alloy is enhanced by additions of other materials. The alloy further comprises from about 1% to about 15% of a second material comprising at least one of tungsten, rhenium, and combinations thereof. Moreover, the alloy comprises up to about 10% of a third material comprising at least one of ruthenium, chromium, and combinations thereof. These additions serve to strengthen the alloy via a solid solution strengthening mechanism, but the amounts added to the alloy are limited by concerns about maintaining oxidation resistance and ductility. The amounts of second and third materials added to the alloy are broadly governed by the respective solubilities of the constituent elements in the A1-structured phase, to avoid precipitation of deleterious amounts of secondary phases. Moreover, the allowed amounts are further restricted in certain embodiments where oxidation resistance is a key concern. For example, in particular embodiments the second material is present in an amount from about 1 atom percent to about 6 atom percent; and the third material is present in an amount up to about 8 atom percent. In these embodiments, the composition of the third material is controlled within the above constraint such that ruthenium is present in an amount up to about 4 atom percent and chromium is present in an amount up to about 6 atom percent.

In certain embodiments, a fourth material is added to the alloy to provide even further strengthening. The fourth material comprises at least one element that not only provides a certain degree of solid solution strengthening when the element itself is dissolved in the A1-structured phase, but also forms a highly stable oxide. Such elements include zirconium, yttrium, hafnium, tantalum, aluminum, titanium, scandium, elements of the lanthanide series, and elements of the actinide series. The alloy, in these embodiments, comprises up to about 3 atom percent of the fourth material, and in certain embodiments, the fourth material is present in an amount from about 0.1 atom % to about 2 atom %. In some embodiments, the fourth material is present in the alloy in the form of a plurality of oxide particles dispersed throughout the alloy, wherein the oxide particles comprise an oxide of the fourth material. The dispersion of fine oxide particles provides a precipitation strengthening effect to the alloy. Typically, the oxide particles used to effect strengthening in metallic materials have a particle size in the range from about 0.1 micrometer to about 10 micrometers. This dispersion may be formed in situ by adding the fourth material in metallic form to the alloy and then exposing the alloy to a heat treatment in an oxidizing environment, a process that is widely known in the art and an example of which is described in U.S. Pat. No. 3,640,705 to Selman et al. Alternatively, at least a portion of the fourth material in oxide form may be directly added to the alloy and mechanically dispersed, in the manner common in the art of mechanically alloyed materials. In either case, at least a portion of the fourth material, in some embodiments, is present as a solute dissolved in said A1 structured phase.

In order to take full advantage of the compositional effects described above, embodiments of the present invention further include an alloy comprising, in atom percent, at least about 50% rhodium, and up to about 49% of a first material, the first material comprising at least one of palladium, platinum, iridium, and combinations thereof. A sum of the amount of rhodium in the alloy plus the amount of the first material in the alloy is at least about 85 atom percent. The alloy further comprises from about 1% to about 6% of a second material, the second material comprising at least one of tungsten, rhenium, and combinations thereof; and up to about 8% of a third material, the third material comprising at least one of ruthenium, chromium, and combinations thereof. The ruthenium is present in an amount up to about 4 atom percent and the chromium is present in an amount up to about 6 atom percent. Furthermore, the alloy comprises up to about 2% of a fourth material, the fourth material comprising at least one of zirconium, yttrium, hafnium, tantalum, aluminum, titanium, scandium, elements of the lanthanide series, elements of the actinide series, and combinations of any of the foregoing. The alloy comprises an A1-structured phase at temperatures greater than about 1000° C., in an amount of at least about 90% by volume.

Alloys set forth herein as embodiments of the present invention are suitable for production using any of the various known methods of metal production and forming. Conventional casting, powder metallurgical processing, directional solidification, and single-crystal solidification are non-limiting examples of methods suitable for forming ingots of these alloys. Thermal and thermo-mechanical processing techniques common in the art for the formation of other alloys, including, for instance, forging and heat treating, are suitable for use in manufacturing and strengthening the alloys of the present invention.

Another embodiment is an article for use in a high temperature, oxidative environment. The article comprises the alloy described above. The article may be one that has been repaired, or it may be a newly manufactured article. In some embodiments, the article comprises a component of a gas turbine engine, such as, for example, a turbine blade, vane, or a combustor component. Up to the entire component may comprise the alloy of the present invention. Furthermore, the alloy of the present invention may be suitably disposed anywhere on the component, including, in certain embodiments, at one or more regions of the component that are particularly prone to experience high local temperatures, such as, for example, leading and trailing edges of blades and vanes, and blade tips. In certain embodiments, the article comprises a coating disposed on a substrate, and the coating comprises the alloy. Suitable methods for disposing the coating include, for example, thermal spraying, plasma spraying, HVOF spraying, and laser deposition. Having only particular sections (i.e., those sections known to experience the most aggressive stress-temperature combinations) of the airfoil comprise the alloy of the present invention minimizes certain drawbacks of alloys comprising significant amounts of platinum group metals such as, for example, platinum, rhodium, and palladium, including their high cost and high density in comparison to conventional airfoil materials. These drawbacks have a reduced effect on the overall component because the comparatively expensive and dense alloy (relative to conventional superalloys) comprises only a fraction of the overall surface area of the component. The properties of the component are thus "tailored" to the expected localized environments, reducing the need for compromise during the design process and increasing the expected operating lifetimes for new and repaired components.

Further embodiments of the present invention include methods for making the article described above, and methods for repairing such an article. The method for making the article comprises providing the alloy described above. In the method for repairing an article, an article is provided. The article, in certain embodiments, comprises a component of a gas turbine engine, including, for example, a blade, a vane, or a combustion component. A repair material is provided, and this repair material comprises the alloy described herein. This repair material is joined to the article. In some embodiments, joining is accomplished, at least in part, by disposing a coating comprising the repair material onto the article being repaired. In other embodiments, the repair material is joined to the substrate by one or more conventional joining processes, including, for example, welding, brazing, or diffusion bonding. Regardless of whether the repair material is in the form of a coating or a solid section, it may be disposed at any section of the article deemed to require the performance characteristics of the repair material. These sections include, for example, the leading and trailing edges of airfoils, and blade tips.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. An alloy consisting of:
   at least about 50 atomic percent rhodium;
   up to about 49 atomic percent of a first material, said first material consisting of at least one of palladium, platinum, iridium, and combinations thereof;
   from about 1 to about 15 atomic percent of a second material, said second material consisting of at least one of tungsten, rhenium, and combinations thereof;
   up to about 10 atomic percent of a third material, said third material consisting of at least one of ruthenium, chromium, and combinations thereof; and
   a fourth material, said fourth material consisting of at least one of zirconium, yttrium, hafnium, tantalum, aluminum, titanium, scandium, elements of the lanthanide series, elements of the actinide series, and combinations thereof, wherein the fourth material is present in an amount from about 0.1 to about 2 atomic percent;
   wherein said alloy has an A1-structured phase at temperatures greater than about 1000° C., in an amount of at least about 90% by volume.

2. The alloy of claim 1, wherein a sum of the amount of rhodium in said alloy plus the amount of said first material in said alloy is at least about 75 atomic percent.

3. The alloy of claim 2, wherein said sum is at least about 85 atomic percent.

4. The alloy of claim 1, wherein
   said second material is present in an amount from about 1 atomic percent to about 6 atomic percent; and
   said third material is present in an amount up to about 8 atomic percent, wherein said ruthenium is present in an amount up to about 4 atomic percent and said chromium is present in an amount up to about 6 atomic percent.

5. The alloy of claim 1, wherein at least a portion of said fourth material is present as a solute dissolved in said A1 structured phase.

6. An alloy consisting of:
   at least about 50 atomic percent rhodium;
   up to about 49 atomic percent of a first material, said first material consisting of at least one of palladium, platinum, iridium, and combinations thereof;
   from about 1 to about 6 atomic percent of a second material, said second material consisting of at least one of tungsten, rhenium, and combinations thereof;
   up to about 8 atomic percent of a third material, said third material consisting of at least one of ruthenium, chromium, and combinations thereof, wherein said ruthenium is present in an amount up to about 4 atomic percent and said chromium is present in an amount up to about 6 atomic percent; and
   a fourth material, said fourth material consisting of at least one of zirconium, yttrium, hafnium, tantalum, aluminum, titanium, scandium, elements of the lanthanide series, elements of the actinide series, and combinations of any of the foregoing, wherein the fourth material is present in an amount from about 0.1 to about 2 atomic percent;
   wherein said alloy has an A1-structured phase at temperatures greater than about 1000° C., in an amount of at least about 90% by volume, and wherein a sum of the amount of rhodium in said alloy plus the amount of said first material in said alloy is at least about 85 atomic percent.

7. An article for use in a high temperature, oxidative environment, said article comprising:
   an alloy, said alloy consisting of:
      at least about 50 atomic percent rhodium;
      up to about 49 atomic percent of a first material, said first material consisting of at least one of palladium, platinum, iridium, and combinations thereof;
      from about 1 to about 15 atomic percent of a second material, said second material consisting of at least one of tungsten, rhenium, and combinations thereof;
      up to about 10 atomic percent of a third material, said third material consisting of at least one of ruthenium, chromium, and combinations thereof; and
      a fourth material, said fourth material consisting of at least one of zirconium, yttrium, hafnium, tantalum, aluminum, titanium, scandium, elements of the lanthanide series, elements of the actinide series, and combinations thereof, wherein the fourth material is present in an amount from about 0.1 to about 2 atomic percent;
   wherein said alloy has an A1-structured phase at temperatures greater than about 1000° C., in an amount of at least about 90% by volume.

8. The article of claim 7, wherein a sum of the amount of rhodium in said alloy plus the amount of said first material in said alloy is at least about 75 atomic percent.

9. The article of claim 7, wherein
   said second material is present in an amount from about 1 atomic percent to about 6 atomic percent; and
   said third material is present in an amount up to about 8 atomic percent, wherein said ruthenium is present in an amount up to about 4 atomic percent and said chromium is present in an amount up to about 6 atomic percent.

10. The article of claim 7, wherein said article comprises a component of a gas turbine assembly.

11. The article of claim 10, wherein said component comprises at least one of a turbine blade, a turbine vane, and a combustor component.

12. The article of claim 11, wherein said component comprises a coating, and said coating comprises said alloy.

13. The article of claim 11, wherein said alloy is disposed on at least one component section selected from the group consisting of a leading edge, a trailing edge, and a blade tip.

14. A component for a gas turbine assembly, said component comprising:
   an alloy, said alloy consisting of,
      at least about 50 atomic percent rhodium;
      up to about 49 atomic percent of a first material, said first material consisting of at least one of palladium, platinum, iridium, and combinations thereof;
      from about 1 to about 6 atomic percent of a second material, said second material consisting of at least one of tungsten, rhenium, and combinations thereof;

up to about 8 atomic percent of a third material, said third material consisting of at least one of ruthenium, chromium, and combinations thereof, wherein said ruthenium is present in an amount up to about 4 atomic percent and said chromium is present in an amount up to about 6 atomic percent; and a fourth material, said fourth material consisting of at least one of zirconium, yttrium, hafnium, tantalum, aluminum, titanium, scandium, elements of the lanthanide series, elements of the actinide series, and combinations of any of the foregoing, wherein the fourth material is present in an amount from about 0.1 to about 2 atomic percent;

wherein said alloy has an A1-structured phase at temperatures greater than about 1000° C., in an amount of at least about 90% by volume, and wherein a sum of the amount of rhodium in said alloy plus the amount of said first material in said alloy is at least about 85 atomic percent.

15. A method for making an article for use in high temperature, oxidative environments, said method comprising:

providing an alloy, said alloy consisting of, at least about 50 atomic percent rhodium;

up to about 49 atomic percent of a first material, said first material consisting of at least one of palladium, platinum, iridium, and combinations thereof;

from about 1 to about 15 atomic percent of a second material, said second material consisting of at least one of tungsten, rhenium, and combinations thereof;

up to about 10 atomic percent of a third material, said third material consisting of at least one of ruthenium, chromium, and combinations thereof; and a fourth material, said fourth material consisting of at least one of zirconium, yttrium, hafnium, tantalum, aluminum, titanium, scandium, elements of the lanthanide series, elements of the actinide series, and combinations thereof, wherein the fourth material is present in an amount from about 0.1 to about 2 atomic percent;

wherein said alloy has an A1-structured phase at temperatures greater than about 1000° C., in an amount of at least about 90% by volume.

* * * * *